United States Patent
Tomura et al.

(10) Patent No.: US 8,660,765 B2
(45) Date of Patent: Feb. 25, 2014

(54) IDLE STOP SYSTEM FOR VEHICLES

(75) Inventors: Masayuki Tomura, Oobu (JP); Takashi Senda, Niwa-gun (JP)

(73) Assignee: Denso Corporation, Kariya (JP)

( * ) Notice: Subject to any disclaimer, the term of this patent is extended or adjusted under 35 U.S.C. 154(b) by 808 days.

(21) Appl. No.: 12/712,603

(22) Filed: Feb. 25, 2010

(65) Prior Publication Data

US 2010/0217493 A1 Aug. 26, 2010

(30) Foreign Application Priority Data

Feb. 25, 2009 (JP) .................................. 2009-041652

(51) Int. Cl.
*G06F 7/00* (2006.01)
*G06F 19/00* (2011.01)
*B60W 10/02* (2006.01)
*F02N 11/08* (2006.01)
*F16H 3/72* (2006.01)

(52) U.S. Cl.
USPC ................. 701/68; 701/51; 701/67; 701/112; 701/113; 477/5; 477/111; 477/166; 477/175; 477/181; 123/179.4; 475/208

(58) Field of Classification Search
USPC ............ 701/51, 67, 68, 112, 113; 477/5, 111, 477/166–175, 180, 181; 123/179.4; 475/208

See application file for complete search history.

(56) References Cited

U.S. PATENT DOCUMENTS

| 6,308,129 | B1* | 10/2001 | Uchida | 701/112 |
| 6,352,489 | B1* | 3/2002 | Kuroda et al. | 477/5 |
| 7,142,973 | B2* | 11/2006 | Ando | 701/112 |
| 7,316,217 | B2* | 1/2008 | Yamada | 123/397 |
| 7,472,688 | B2* | 1/2009 | Nakauchi et al. | 123/406.53 |
| 2009/0138184 | A1* | 5/2009 | Terada | 701/112 |

FOREIGN PATENT DOCUMENTS

| JP | A-57-121938 | 7/1982 |
| JP | A-2000-18060 | 1/2000 |
| JP | A-2004-092453 | 3/2004 |
| JP | A-2007-024129 | 2/2007 |

OTHER PUBLICATIONS

Japanese Office Action issued in Application No. 2009-041652; Dated Dec. 21, 2010 (With Translation).

* cited by examiner

*Primary Examiner* — James Trammell
*Assistant Examiner* — Majdi Alsomiri
(74) *Attorney, Agent, or Firm* — Oliff PLC

(57) ABSTRACT

In an idle stop system for an engine mounted in a vehicle, when it is determined predetermined stop conditions are met, the engine is automatically stopped. During the engine stop, when it is determined that predetermined restart conditions are met, the engine is automatically restarted. Further, it is determined whether or not a predetermined period of time has elapsed since the restart of the engine. When it is determined that the predetermined period of time has elapsed, the clutch mechanism is controlled into the connection thereof at and after a time instant when it is determined that the predetermined period of time has elapsed. Hence, the connected state of the clutch mechanism is realized after a controlled delay.

20 Claims, 7 Drawing Sheets

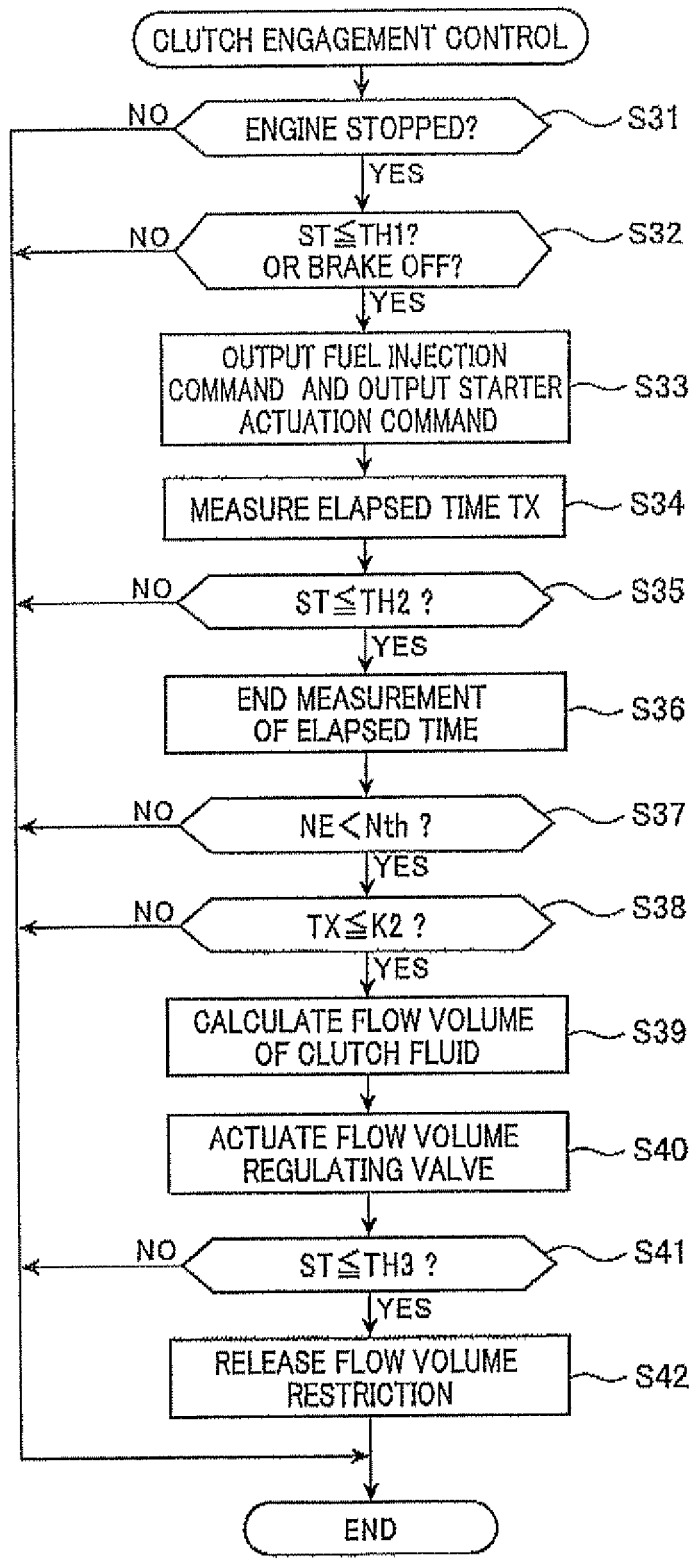

IDLE STOP SYSTEM FOR VEHICLES

CROSS-REFERENCE TO RELATED APPLICATION

This application is based on and claims the benefit of priority from earlier Japanese Patent Application No. 2009-041652 filed Feb. 25, 2009, the description of which is incorporated herein by reference.

BACKGROUND OF THE INVENTION

1. Technical Field of the Invention

The present invention relates to an idle stop system mounted in a vehicle.

2. Related Art

Recently, with an increasing need for reducing fuel consumption, for example, to reduce emission of $CO_2$ or to save the cost of fuel, a technique associated with so-called idle-stop control has been developed. It is known that, under idle-stop control, i.e. in an idling mode, the engine is automatically stopped when predetermined stop conditions are met, and then, the engine is automatically restarted when predetermined restart conditions are met. Performing idle-stop control effectively contributes to the reduction of fuel consumption.

In a vehicle equipped with a manual transmission, there is concern that an engine start failure may be caused in restarting the engine from an automatically stopped state, if a clutch-engaging operation is performed before completion of the engine start.

In order to mitigate the problem mentioned above, JP-A-2000-018060 discloses a technique related to an idle stop system mounted in a vehicle. According to the technique, the idle stop system performs three control processes which are: transmission control that controls the automatic transmission; automatic stop control that automatically stops the engine when predetermined stop conditions are met; and automatic start control that automatically starts the engine when predetermined start conditions are met.

In the idle stop system disclosed in this patent document, the automatic stop control is configured to be cancelled when the time spent after the engine start is less than a preset time period, or when the number of the automatic start controls is equal to or more than a preset number of times. Meanwhile, by performing the transmission control on the automatic transmission, the clutch is prevented from achieving engagement while the engine start is incomplete, which would otherwise have been caused by human error. Thus, the engine start and the start of running after the automatic engine stop have been configured to be smoothly conducted.

However, in a vehicle system equipped with a manual transmission, the existing techniques including one disclosed in JP-A-2000-018060 mentioned above cannot provide a fundamental resolution for the engine start failure at the time of restarting the engine, which failure is caused by performing clutch engagement before the engine start is complete.

SUMMARY OF THE INVENTION

The present invention has been made in light of the problem as set forth above and has as its principal object to provide an idle stop system which is able to enhance the startability of the engine when the engine is restarted from the automatically stopped state.

According to the present invention, there is provided an idle stop system for an engine mounted in a vehicle; comprising: clutch means that that enables and disables power transmitted from the engine to a transmission depending on instructions from a driver on the vehicle, wherein the clutch comprises a manipulation device that produces the instructions in response to manipulations by the driver and a clutch mechanism that selectively provides an engaged state thereof for transmitting the power and a disengaged state thereof for shutting off the power; first determination means that determines whether or not predetermined stop conditions are met when the engine is in operation; first control means that automatically stops the operation of the engine when it is determined by the first determination means that the predetermined stop conditions are met; second determination means that determines whether or not predetermined restart conditions are met after the engine is stopped by the first control means; second control means that restarts the operation of the engine when it is determined by the second determination means that the predetermined restart conditions are met; third determination means that determines whether or not a predetermined period of time has elapsed since the restart of the engine; and third control means that instructs the clutch mechanism to engage at and after a time instant when it is determined by the third determination means that the predetermined period of time has elapsed.

It should be appreciated that the "predetermined time of period" may be the time required for ensuring a predetermined amount of increase of the engine speed (hereinafter referred to "engine-speed increase") after starting restart of the engine (hereinafter referred to "engine restart").

In other words, at the engine restart after the engine has been automatically stopped, if the clutch is switched to an engaged state in the state where the engine speed has not been fully increased, the transmission will be a load against the engine rotation to prevent the increase of the engine rotation. As a result, the engine startability will be deteriorated.

In this regard, with the present invention, the clutch mechanism is brought into a clutch-engaged state after expiration of the predetermined time from the start of engine restart as described above. Therefore, the increase of engine rotation may not be prevented in the state where the engine speed has not been fully increased immediately after the engine restart. As a result, startability at the engine restart after the engine has been automatically stopped can be enhanced.

It is preferred that the third control means includes delay control means that delays a switchover from the disengaged state of the clutch mechanism to the engaged state of the clutch mechanism in response to a driver's manipulation of the manipulation device.

With this configuration, the clutch mechanism can be brought into a clutch-engaged state after expiration of the predetermined time from the start of engine restart. Thus, the engine startability can be enhanced as mentioned above.

It is also preferred that the third control means includes delay control means that delays a switchover from the disengaged state of the clutch mechanism to the engaged state of the clutch mechanism in response to a driver's manipulation of the manipulation device.

With this configuration, the engine speed can be increased up to the startup-completion engine speed (the speed that would be achieved after the engine speed has been fully increased) before the clutch mechanism is brought into the clutch-engaged state. Thus, the deterioration of engine startability can be prevented from occurring accompanying the clutch switchover operation.

The startup-completion engine speed may only have to be a speed sufficient for generating sufficient torque for driving the vehicle. For example, the startup-completion engine speed may be the idling speed of the engine, or a speed proximate to the idling speed. Also, the startup-completion engine speed may refer to an engine speed that can propel the vehicle only by the torque of the engine rotation without relying on the starting torque of the starter.

Preferably, the system may include elapsed time calculation means that calculates an elapsed time from restarting the engine, wherein the delay control means is configured to delay the switchover from the disengaged state to the engaged state of the clutch mechanism based on the elapsed time calculated by the elapsed calculation means.

Specifically, if the elapsed time is long from the start of engine restart up to the predetermined time point before the clutch engagement, it is estimated that time is well ensured before the engine speed is increased. On the other hand, if the elapsed time is short, it is estimated that the increase of the engine speed will be insufficient.

In this regard, with the present invention, the delay control is performed on the clutch mechanism based on the elapsed time from the start of engine restart as mentioned above. Thus, the clutch switchover operation can be appropriately delayed as required.

For example, the switchover operation may be ensured to be delayed only when the elapsed time is shorter than a predetermined time. Thus, the clutch switchover operation can be prevented from being delayed when the delay is not necessary.

The "predetermined time point before clutch-engaged state is achieved" refers to a time point when, for example, the driver's is manipulation position of the manipulating part fails on a predetermined manipulation position before the manipulation position corresponding to the clutch-engaged state. Specifically, the "predetermined time point before clutch-engaged state is achieved" refers to a time point that achieves a predetermined clutch stroke before the clutch-engaged state (contact position) is achieved changing from a maximum clutch stroke (corresponding to the position where the clutch pedal is fully depressed). The "clutch stroke" here refers to the degree of depressing the clutch pedal.

The delay control means may be configured to change a delay time required to start the switchover from the disengaged state to the engaged state of the clutch mechanism, depending on the calculated elapsed time.

For example, as the elapsed time from the start of engine restart is shorter, the degree of delay may be made larger.

It is considered that there is a time difference between the timing of starting engine restart and the timing of starting clutch-engaging operation which is performed through the driver's manipulation of the clutch pedal. It is also considered that the speed of the driver's manipulation of the clutch pedal, for example, may be different between drivers, and that the same driver may manipulate the clutch pedal with different speed every time the driver manipulates the clutch pedal.

In such a case, it is considered that the delay in the switchover operation of the clutch mechanism may sometimes be too long or too short.

In this regard, when the clutch pedal is manipulated at different timings for restarting the engine or at different speeds, the switchover can be delayed in a controlled manner depending on those differences in the manipulation timing or the manipulation speed.

Preferably, a period of time required for the engine to reach the predetermined rotation speed is fixed beforehand, and the delay control means includes means for obtaining a remaining time period which is left in the time required for the engine to reach the predetermined rotation speed, and means for controlling the delay time for the switchover of the clutch mechanism from the disengaged state to the engaged state.

Specifically, the time required for increasing the engine speed (hereinafter referred to as "engine-speed-increase lead time") after the start of engine restart can be estimated based the engine characteristics, the starter characteristics, and the like. Also, the remaining time of the engine-speed-increase lead time depends on the elapsed time from the start of engine restart. Therefore, a preferable delay control can also be performed using the remaining time. In this case, the degree of delay may be changed based on the remaining time of the engine-speed-increase lead time. Specifically, as the remaining time of the engine-speed-increase lead time is longer, the degree of delay may be made larger.

It is preferred that the predetermined restart conditions are composed of a driver's restart manipulation of the manipulation device for restarting the engine, the second determination means includes manipulation determination means for determining whether or not the driver's restart manipulation has been performed at the manipulation device, the system comprises means for detecting a speed of the driver's restart manipulation after the manipulation means determines that the driver's restart manipulation has been performed, and the delay control means is configured to control the delay for the switchover of the clutch mechanism from the disengaged state to the engaged state, depending on the speed of the driver's restart manipulation.

Specifically, the engine restart is configured to be started with the start of manipulating the manipulation device for connecting the motive power to the transmission. In such a configuration, if the clutch-engaging operation is performed comparatively slowly (taking time) after the start of engine restart, the engine speed can be expected to be fully increased by the time the clutch-engaged state is achieved. On the other hand, if the clutch-engaging operation is performed quickly (in a short time), the increase of the engine speed will be insufficient.

In this regard, by performing the delay control on the clutch mechanism based on the manipulation speed of the manipulation device after the start of engine restart, as mentioned above, the clutch switchover operation can be appropriately delayed as required.

For example, the clutch switchover operation may be delayed only when the manipulation speed is higher than a predetermined speed. Thus, the clutch switchover operation can be prevented from being performed when the operation is not necessary.

As an example, the delay control for the switchover is carried out through a degree of the delay, that is, a delay time. For example, as the manipulation speed of the manipulation device is higher, the degree of delay may be made larger.

It is considered that the speed of clutch manipulation may be different between drivers, and that the same driver may manipulate the clutch pedal with different speed every time the driver manipulates the clutch pedal. In such a case, it is considered that, when the clutch switchover operation is delayed in the clutch mechanism, the delay can be insufficient or excessive.

In this regard, even when the clutch pedal is manipulated at different speeds, the switchover control is delayed properly, improving the startability of the engine.

It is also preferred that the system further includes rotation speed detecting means for detecting the rotations speed of the engine; and rotation speed determining means for determining, after restarting the engine but before the engaged state of the clutch mechanism, whether or not the rotation speed of the engine detected by the rotation speed detecting means is larger than the predetermined rotation speed showing completion of starting up the engine, wherein the delay control means is configured to enable the delay of the switchover of the clutch mechanism from the disengaged state thereof to the engaged state thereof when the rotation speed determining means determines that the detected rotation speed of the engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

Specifically, in performing the switchover operation in the clutch mechanism, the switchover operation is not required to be delayed if the engine speed has been fully increased. In this case, unnecessary delay control can be prevented from being performed, in the present invention, for the switchover operation of the clutch mechanism.

Further, the system may further includes a master cylinder that operates in response to the driver's manipulation of the clutch device; a fluid path through which clutch fluid passes; and a release cylinder connected to the master cylinder via the fluid path, wherein the delay control means is configured to adjust a volume of the clutch fluid passing the fluid path such that the delay for the switchover of the clutch mechanism from the disengaged state thereof to the engaged state thereof is controlled.

An electrical configuration (e.g., controlling means) is optional in delaying the switchover operation for switching the clutch mechanism from the power-disconnected state to the power-connected state, against the manipulation of the manipulation device.

The idle stop system may further include a master cylinder that operates in response to the driver's manipulation of the clutch device; a fluid path through which clutch fluid passes; and a release cylinder connected to the master cylinder via the fluid path, wherein the delay control means is a fluid volume adjuster that adjusts the clutch fluid such that a volume of the fluid volume passing from the master cylinder to the release cylinder when the manipulation device is manipulated for the disengaged state is less than a volume of the fluid passing from the release cylinder to the master cylinder when the manipulation device is manipulated for the engaged state.

With the above configuration, the flow volume of the clutch fluid that flows from the release cylinder to the master cylinder when the manipulation device is manipulated to the side of connecting motive power (e.g., when the clutch pedal is released from being depressed), can be made smaller than the flow volume of the clutch fluid that flows from the master cylinder to the release cylinder when the manipulation device is manipulated to disengage the clutch (e.g., when the clutch pedal is depressed).

Thus, even when the driver has quickly manipulated the manipulation device to the side of connecting motive power immediately after the start of engine restart, the switchover operation of the clutch mechanism can be intentionally delayed against the manipulation of the manipulation device. Accordingly, the deterioration of engine startability can be prevented from occurring accompanying the clutch switchover operation.

The maximum value of the delay time in this configuration may be about 100 to 200 msec, or the like. Thus, the delay control can be performed without causing concern to the driver.

In this configuration, as an example, the fluid path is provided with a first path and a second path which are in parallel with each other, the fluid volume adjuster comprises a check valve means which i) enables the clutch fluid to pass from the master cylinder to the release cylinder and ii) enables the clutch fluid to pass at a lesser volume thereof or to be prohibited from the release cylinder to the master cylinder, the check valve being provided in the first path, and the second path is provided to bypass the check valve means and has a flow path area smaller than a flow path area of the first path.

With the above configuration, the clutch fluid mainly flows through the first path when the manipulation device is manipulated to the side of disconnecting motive power (e.g., when the clutch pedal is depressed). Then, the clutch fluid mainly flows through the second path when the manipulation device is manipulated to the side of connecting motive power (e.g., when the clutch pedal is released from being depressed).

In this case, the flow volume of the clutch fluid that mainly flows through the second path when the manipulation device is manipulated to the side of connecting motive power can be reduced so as to be less than the flow volume of the clutch fluid that mainly flows through the first path when the manipulation device is manipulated to the side of disconnecting motive power. As a result, the switchover operation of the clutch mechanism can be intentionally delayed against the manipulation of the manipulation device.

The third control means may be a delay mechanism that is provided at the clutch means and formed to generate a delay in operating the manipulation device from a timing at which the driver manipulates the manipulation device to restart the engine.

With the above configuration, even when the driver has quickly manipulated the manipulation device immediately after the start of engine restart, or specifically, even when the driver has quickly released the clutch pedal from being depressed, the movement of the manipulation device can be intentionally delayed against the driver's manipulation. Thus, the deterioration of engine startability can be prevented from occurring accompanying the clutch switchover operation.

A generally known clutch means is provided with biasing means (e.g., return spring) that restores a clutch manipulating member (e.g., clutch pedal), i.e. the manipulation device, from a manipulated state thereof to a non-manipulated state thereof.

In such a configuration, it is preferred that wherein the manipulation device comprises a member that allows the driver to manipulates the clutch device, the clutch means has biasing means that restores the member from a manipulated state thereof to a non-manipulated state thereof, and the delay mechanism has a bias force which is set such that, when a speed of a driver's release manipulation from the member is equal to or less than a predetermined amount, a restoration speed of the member to the non-manipulated state thereof is substantially equal to the speed of the driver's release manipulation, and when the speed of the driver's release manipulation from the member is larger than the predetermined amount, the restoration speed of the member to the non-manipulated state thereof is smaller than the speed of the driver's release manipulation.

BRIEF DESCRIPTION OF THE DRAWINGS

In the accompanying drawings:

FIG. 6 is a flow diagram illustrating a procedure of clutch engagement control performed in the system, according to a second embodiment of the present invention;

DETAILED DESCRIPTION OF THE PREFERRED EMBODIMENTS (First Embodiment)

Figure 1:
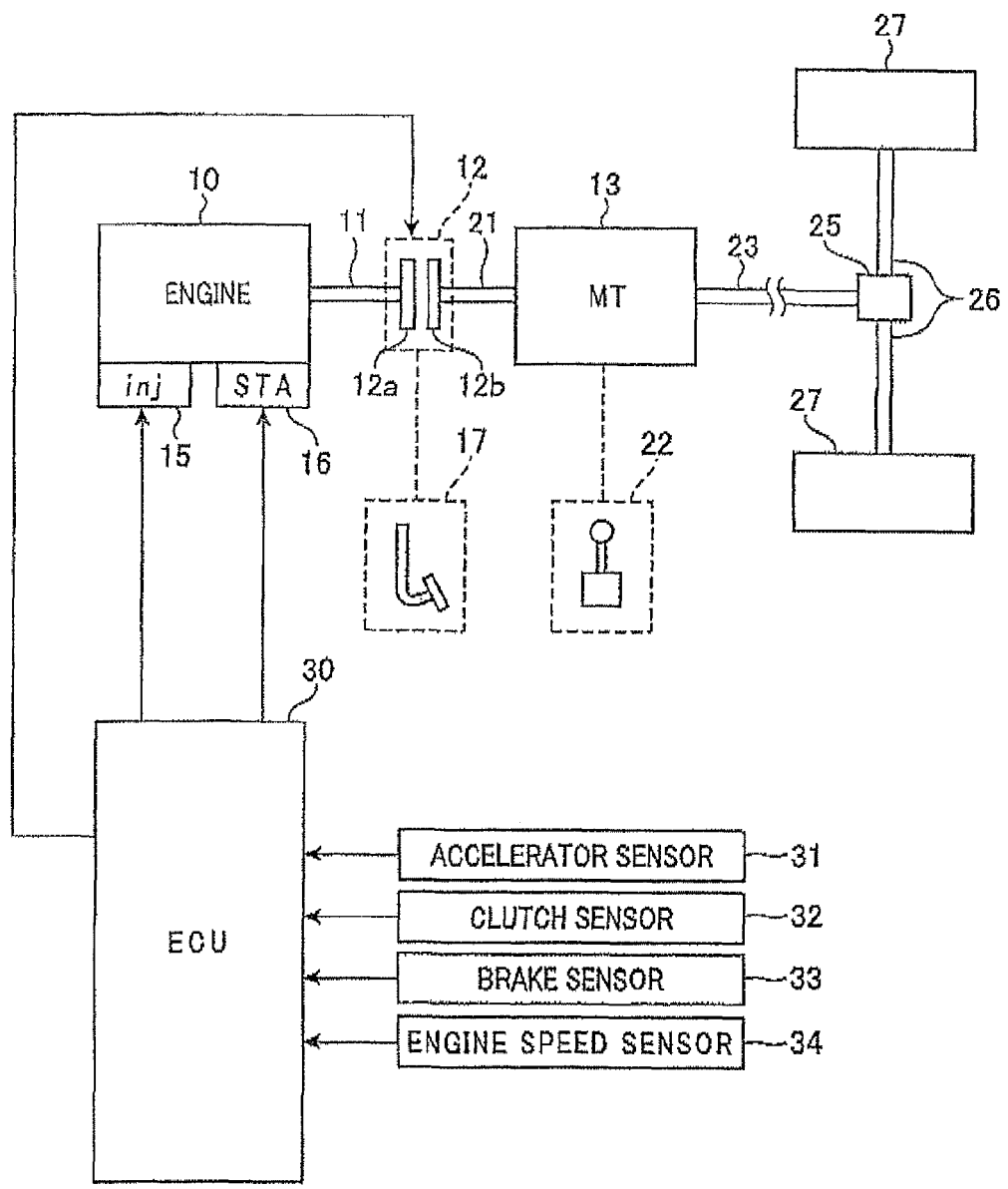
FIG. 1 is a schematic block diagram illustrating a vehicle control system used in various embodiments of the present invention.

With reference to the accompanying drawings, hereinafter will be described a first embodiment of the present invention. In the first embodiment, the present invention is applied to a vehicle equipped with an engine and a manual transmission. FIG. 1 shows a vehicle control system in such a vehicle.

As shown in FIG. 1, the vehicle control system includes an engine 10, an output shaft (crank shaft) 11 of the engine 10, a clutch 12, and a transmission 13 connected to the output shaft 11 via the clutch 12. The engine 10 is a multicylinder gasoline engine or the like. The engine 10 is provided with, injectors 15 for respective cylinders to serve as fuel injection means. The engine 10 is also provided with spark plugs (not shown) for the respective cylinders to serve as ignition means. The engine 10 is further provided with a starter 16 serving as a starter that imparts initial rotation (cranking rotation) to the engine 10 when the engine is started. It should be appreciated that the engine 10 is not limited to a gasoline engine, but may be a diesel engine.

The clutch 12 is a single-plate dry friction clutch that includes a flywheel (engine-side disc) 12a connected to the engine output shaft 11 and a clutch disc (transmission-side disc) 12b connected to a transmission input shaft 21. With the driver's depressing manipulation or releasing manipulation of a clutch pedal 17, the flywheel 12a and the clutch disc 12b are adapted to be switched either to a contact state or a separate state. Specifically, the clutch 12 is subjected to engagement/disengagement in response to the manipulation of the clutch pedal 17. More specifically, when the clutch pedal 17 is depressed by the driver, the flywheel 12a and the clutch disc 12b are adapted to be separated from each other to disconnect the motive power from the engine 10 to the transmission 13. On the other hand, when the clutch pedal is released from being depressed, the flywheel 12a and the clutch disc 12b are adapted to be brought into contact with each other to connect the motive power from the engine 10 to the transmission 13.

The clutch pedal 17 corresponds to the clutch means and the clutch 12 (including an actuator described later) corresponds to the clutch mechanism of the clutch means.

The transmission 13 is a manual transmission whose gear ratio can be switched by the manual manipulation of a shifter 22. The transmission 13 is provided with a multi-stage forward gear, a backward gear and a neutral gear. In the transmission 13, the rotation of the transmission input shaft 21 is converted into the rotation of a transmission output shaft 23 with the gear ratio corresponding to the shift position of the moment. The transmission output shaft 23 is so connected to wheels (drive wheels) 27 via a differential gear 25, a drive shaft 26 and the like.

Figure 2:
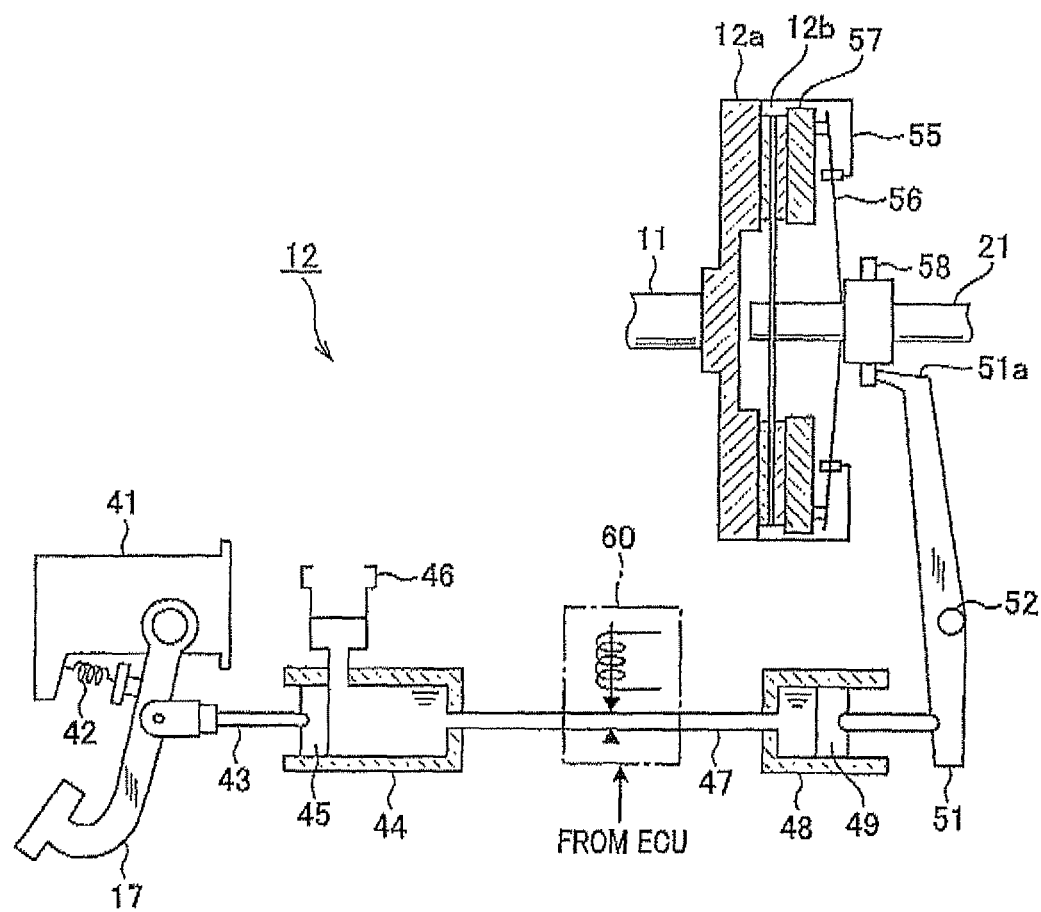
FIG. 2 is a configurational diagram illustrating a clutch in the vehicle control system.

Referring to FIG. 2, the configuration of the actuator of the clutch 12 is explained. In FIG. 2, the clutch pedal 17 has a base end portion supported by a vehicle body 41 in a pivotally rotatable manner. The clutch pedal 17 is constantly biased in one pivotal direction by a return spring 42. When the clutch pedal 17 is in an non-depressed state (normal state), a part of the pedal is held in a state of being in contact with a stopper, not shown, by the bias force of the return spring 42. When the clutch pedal 17 is depressed by the driver's foot manipulation, the pedal pivotally rotates against the bias force of the return spring 42. When the driver withdraws his/her foot from the pedal afterwards, the clutch pedal 17 is restored to the original position by the bias force of the return spring 42.

The clutch pedal 17 is incorporated with a push rod 43 which is displaced in response to the depressing manipulation of the pedal. The push rod 43 has an end portion to which a piston 45 is connected so as is to be reciprocated in a master cylinder 44. The capacity (cylinder capacity) inside the master cylinder 44 is increased/decreased depending on the position of the piston. With the increase/decrease of the capacity, the clutch fluid goes in and goes out. The clutch fluid is ensured to be appropriately supplied into the master cylinder 44 from a reservoir 46.

The master cylinder 44 is connected to a release cylinder 48 via a hydraulic oil line 47 which constitutes a clutch fluid path. The release cylinder 48 accommodates a piston 49 which is able to reciprocally move in the release cylinder 48. The piston 49 is connected to one end of a release fork 51 which is supported centering on a shaft 52 in a pivotally rotatable manner.

The flywheel 12a is attached with a clutch cover 55 so that the flywheel and the clutch cover can be rotated in an integral manner. The clutch cover 55 is integrally provided with a diaphragm spring 56 and a pressure plate 57. The clutch disc 12b is interposed between the flywheel 12a and the pressure plate 57. The engagement of the clutch disc 12b is established such that the clutch disc can integrally rotate with the transmission input shaft 21 and can be slid in the axial direction. The transmission input shaft 21 is mounted with a release bearing 58 so as to be slidable in the axial direction. The release bearing 58 is in contact with a tip end 51a of the release fork 51, the tip end being on the side opposite to the release cylinder 48.

In the configuration as described above, in the state where the clutch pedal 17 is not depressed, the pressure plate 57 is pressed against the clutch disc 12b by the diaphragm spring 56. Thus, frictional force is produced between the flywheel 12a and the clutch disc 12b to thereby connect the motive power from the engine 10 to the transmission 13.

On the other hand, when the clutch pedal 17 is depressed by the driver, the piston 45 is moved to reduce the capacity of the master cylinder 44. Then, the clutch fluid moves into the release cylinder 48 from the master cylinder 44 via the hydraulic oil line 47. As a result, the piston 49 of the release cylinder 48 is moved to pivotally rotate the release fork 51, thereby allowing the tip end 51a to push the release bearing 58 to the side of the flywheel 12a. Then, the pressing force of the pressure plate 57 against the clutch disc 12b is weakened to release the frictional connection between the flywheel 12a and the clutch disc 12b. As a result, the motive power transmitted from the engine 10 to the transmission 13 is disconnected.

After that, when the clutch pedal 17 is released from being depressed, the clutch fluid moves into the master cylinder 44 from the release cylinder 48 via the hydraulic oil line 47. Thus, the pressure plate 57 is restored to the state of being pressed against the clutch disc 12b by the diaphragm spring 57 (clutch-engaged state). In this way, the clutch 12 is switched from a power-disconnected state to a power-connected state.

The clutch 12 of the present embodiment is provided with a flow volume regulating valve 60 as flow volume regulating means. The flow volume regulating valve 60 is disposed at the hydraulic oil line 47 that allows communication between the master cylinder 44 and the release cylinder 48. The flow volume regulating valve 60 plays a role of changing the cross-sectional area of the clutch fluid path. The flow volume regulating valve 60 has a throttle which is operated by an electromagnetic actuator, for example.

The throttle is adapted to increase/decrease the cross-sectional area of the clutch fluid path to thereby regulate the flow volume of the clutch fluid that flows through the hydraulic oil line 47 (flow volume per unit time). In the state where the flow volume regulating valve 60 has a maximum opening, the flow volume of the clutch fluid that flows from the master cylinder 44 to the release cylinder 48 will not be restricted. On the other hand, when the cross-sectional area of the fluid path is reduced by reducing the opening of the throttle from the maximum opening, the flow volume of the clutch fluid is ensured to be restricted.

Referring to FIG. 1 again, the vehicle control system is provided with an ECU 30 that is an electronic control unit (controlling means) including a known microcomputer or the like. The ECU 30 performs various engine controls including control over the quantity of the fuel injected by the injectors 15 and control aver ignition, as well as control over the actuation of the starter 16, based on the results of detection, for example, derived from various sensors provided in the system.

Specifically, the various sensors connected to the ECU 30 include an accelerator sensor 31 that senses the amount of depressing manipulation of the accelerator pedal (not shown), a clutch sensor 32 that senses the amount of depressing manipulation (clutch stroke) of the clutch pedal 17, a brake sensor 33 that senses the amount of depressing manipulation of the brake pedal (not shown), and an engine speed sensor 34 that senses the engine speed. Detection signals from these sensors are adapted to be sequentially inputted to the ECU 30. Besides the sensors mentioned above, the vehicle control system is also provided with load sensors (air flow meter, intake pressure sensor), vehicle speed sensor, and the like, which are not shown.

Hereinafter, idle-stop control performed in the above system configuration will be described in detail. To roughly explain, under the idle-stop control, the engine 10 is automatically stopped when predetermined stop conditions are met while the engine 10 is operated in an idling mode, and then the engine 10 is restarted when predetermined restart conditions are met. The engine stop conditions include, for example, at least any one of the conditions: that the manipulation amount of the accelerator has become "0" (the mode of the engine operation has been switched to an idling mode); that the brake pedal has been depressed; and that the vehicle speed has been reduced to a predetermined speed or less.

The engine restart conditions include, for example, at least any one of the conditions: that the brake pedal has been released from being depressed to turn off the output of the brake sensor 33; and that releasing manipulation of the clutch pedal 17 has started. To additionally explain the releasing manipulation of the clutch pedal, the engine restart conditions will be met when the driver starts releasing the clutch pedal 17 from the state where the clutch pedal is completely depressed.

In restarting the engine after being automatically stopped, it may sometimes happen that the clutch is switched to the power-connected state before the engine speed is fully increased. In such a case, the transmission 13 will become a load against the engine rotation and thus will prevent the increase of rotation at the startup, causing a problem of deteriorating the startability of the engine.

The vehicle control system according to the present embodiment can cope with this problem. Specifically, in the present embodiment, delay control is performed in switching the clutch 12 into the power-connected state after starting restart of the engine 10. More specifically, the switching operation of the clutch 12 is controlled and delayed after the start of the releasing manipulation of the clutch pedal 17, so that the engine speed will have reached a predetermined startup-completion engine speed (the speed that would be achieved after the engine speed has been fully increased) at the time point when the clutch-engaged state is achieved for starting transmission of motive power in the clutch 12.

Specifically, the elapsed time from the start of the restart of the engine 10 is calculated. Then, the switching operation in the clutch 12 is controlled and delayed based on the elapsed time, at a predetermined time point before the clutch-engaged state is achieved in the clutch 12.

It should be appreciated that the "startup-completion engine speed" may only have to be a speed sufficient for generating the torque which can undertake the driving force of the vehicle. For example, the "startup-completion engine speed" may be the idling speed of the engine.

Figure 3:
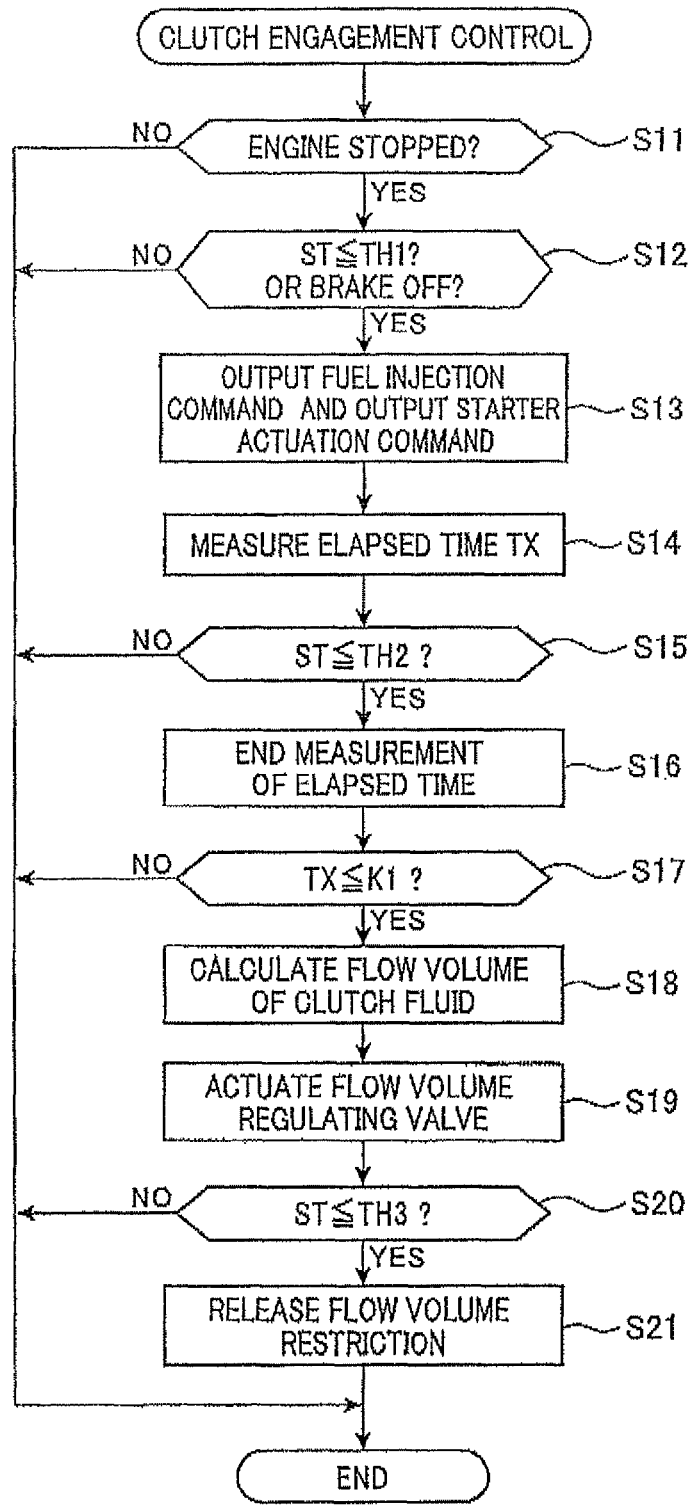
FIG. 3 is a flow diagram illustrating a procedure of clutch engagement control performed in the system, according to a first embodiment.

FIG. 3 is a flow diagram illustrating the procedure of clutch engagement control. This control is repeatedly performed by the ECU 30 at a predetermined cycle.

In FIG. 3, it is determined, at step S11, whether or not the engine 10 has been automatically stopped. If the determination is "YES" at step S11, control proceeds to the subsequent step S12.

At step S12, it is determined whether or not the clutch pedal 17 has been released from the fully depressed state to turn a clutch stroke ST to a level equal to or less that a threshold TH1, or whether or not the brake pedal has been released from being depressed to turn off the detection signals from the brake sensor 33 (brake OFF). The clutch stroke ST is calculated based on the detection signal from the clutch sensor 32.

The determination made at step S12 is associated with an engine restart condition. The clutch stroke ST will have a larger value as the amount of depressing the clutch pedal becomes larger. The threshold TH1 is set proximate to a value corresponding to a completely depressed position of the clutch pedal 17 (position corresponding to: clutch stroke-100%). For example, the threshold TH1 may be set as: TH1=clutch stroke 98%. Specifically, when the driver starts releasing the clutch pedal 17 from its completely depressed state (i.e. when the releasing manipulation of the clutch is started), a relation ST≤TH1 will constitute. If the determination at step S12 is "YES", control proceeds to step S13. If the determination at step S12 is "NO", the present control is ended (suspended).

At step S13, a restart process of the engine 10 is carried out. Specifically, a fuel injection command and a starter actuation command are outputted. With these commands, cranking is started by the starter 16. At the same time, the injectors 15 start injecting fuel to the respective cylinders. After that, at step S14, an elapsed time TX from the start of the restart of the engine (engine restart) is measured. In other words, the measurement of the elapsed time TX is started at the time point when the engine restart is started.

Then, at step S15, it is determined whether or not the clutch stroke ST is equal to or less than a threshold TH2. In this case, the threshold TH2 is set to a value smaller than the threshold TH1 mentioned above (TH2<TH1), but a value larger than a clutch engagement point (also called "clutch contact point") when motive power is started to be transmitted from the engine 10 to the transmission 13. In the present embodiment, the threshold TH2 may be set as: TH2=clutch stroke 75%. If a relation ST≤TH2 is satisfied, control proceeds to the subsequent step S16. If the relation ST>TH2 is satisfied, the present control is ended.

At step S16, the measurement of the elapsed time TX is ended. At the subsequent step S17, it is determined whether or not the elapsed time of the moment is equal to or less than a predetermined threshold K1. The elapsed time TX at step S17 is the time required from the start of the engine restart up to the point when a relation "clutch stroke=75%" (threshold TH2) is satisfied. If a relation TX>K1 is satisfied, the elapsed time from the engine restart is sufficiently long. Accordingly, it is estimated that the engine speed will have been well increased at the time point when the clutch-engaged state is achieved. On the other hand, if the relation TX≤K1 is satisfied, the elapsed time from the engine restart is short. Accordingly, it is estimated there is a probability that the engine speed will not have been fully increased at the time point when the clutch-engaged state is achieved.

In particular, when the engine restart is started with the releasing manipulation of the clutch pedal 17, the elapsed time TX corresponds to the time required for the clutch stroke ST to change from 98% (threshold TH1) to 75% (threshold TH2). In this case, if TX>K1, decreasing change of the clutch stroke ST is slow, i.e. the speed of manipulating and releasing the clutch (hereinafter referred to as "speed of clutch-releasing manipulation") is comparatively low. Accordingly, it is estimated that the engine speed will have been fully increased at the time point when the clutch-engaged state is achieved. On the other hand, if TX≤K1, the decreasing change of the clutch stroke ST is fast, i.e. the speed of clutch-releasing manipulation is comparatively high. Accordingly, it is estimated that the engine speed will not have been fully increased at the time point when the clutch-engaged state is achieved.

If TX>K1 ("NO" at step S17), the present control is ended. In this case, the opening of the flow volume regulating valve 60 remains maximum. Thus, the delay control (switching operation from the power-disconnected state to the power-connected state) for delaying the engagement of the clutch (hereinafter referred to as "clutch-engaging operation") will not be performed.

If TX≤K1 ("YES" at step S17), control proceeds to step S18. At step S18 and the subsequent steps, the delay control is performed to delay the clutch-engaging operation. Specifically, at step S18, the so flow volume of the clutch fluid to be passed through the hydraulic oil line 47 is calculated based on the elapsed time TX.

Figure 4A:
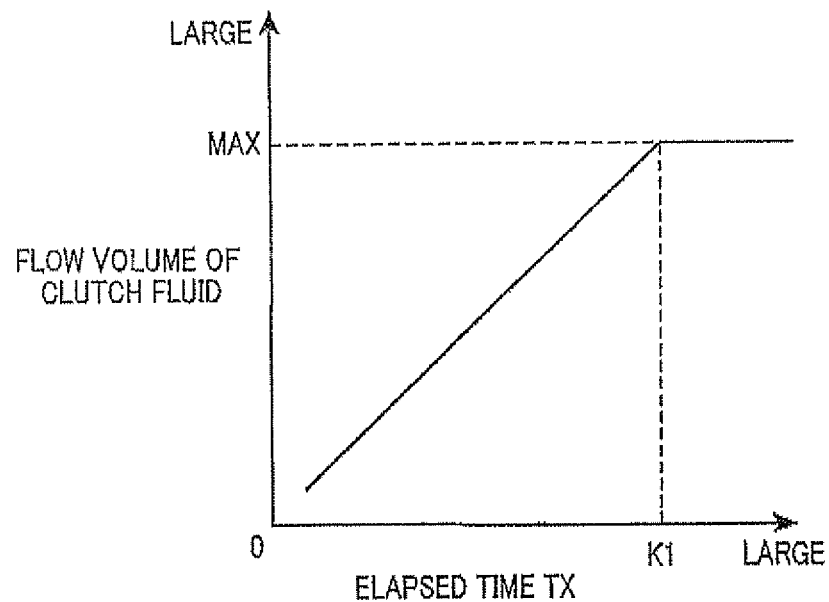
FIGS. 4A and 4B each illustrate a relationship between elapsed time and flow volume of clutch fluid in the system.

In this case, the flow volume of the clutch fluid is calculated using the relationship shown in FIG. 4A. In FIG. 4A, it is ensured that, as the elapsed time TX becomes larger, the flow volume of the clutch fluid is calculated to be a larger value. When TX>K1, the clutch fluid volume is ensured to be the maximum value MAX (i.e. the flow volume regulating valve 60 is ensured to have the maximum opening). In other words, in FIG. 4A, when TX≤K1, a relationship is ensured to be established, such that, as the elapsed time TX is shorter, the restricted amount of the flow volume of the clutch fluid becomes larger.

In this case, as the restricted amount of the flow volume of the clutch fluid is larger, the degree of delay in the switchover operation of the clutch engagement will become larger. Accordingly, even when the elapsed time TX is comparatively short (even when the speed of clutch-releasing manipulation is comparatively high), the time during which the clutch-engaged state is achieved can be ensured. As a result, the engine speed can be allowed to reach the predetermined startup-completion engine speed (e.g., idling speed) by the time the clutch-engaged state is achieved.

Figure 4B:
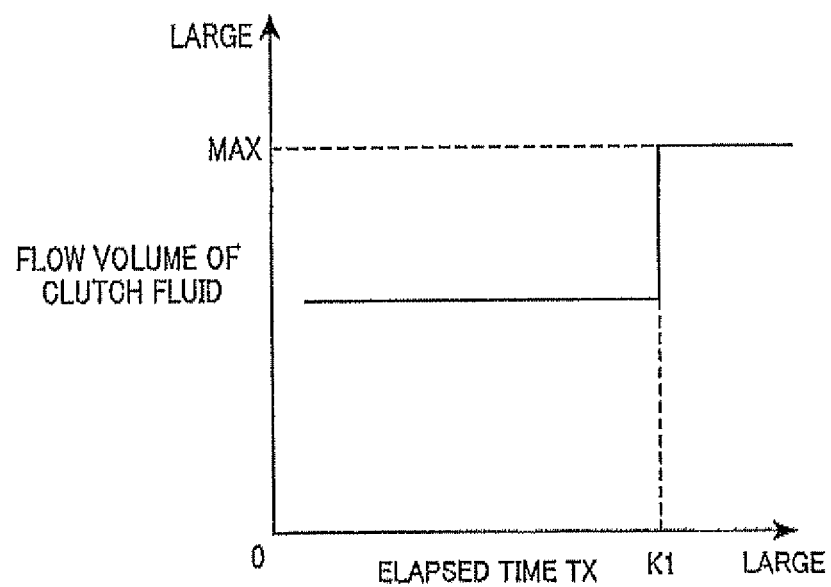

The configuration may be such that the flow volume of the clutch fluid is calculated using the relationship shown in FIG. 4B. In FIG. 4B, the flow volume of the clutch fluid is ensured to be set to a fixed value when TX≤K1. Specifically, the restricted amount of the flow volume of the clutch fluid is set to a fixed value. In this case, switchover is performed, according to the elapsed time TX, between executing and not executing the delay control for rendering the flow volume of the clutch fluid to be a fixed value.

Then, at step S19, the flow volume regulating valve 60 is actuated based on the flow volume of the clutch fluid calculated at step S18. In this case, the flow volume of the clutch fluid is regulated, as appropriate, by allowing the flow volume regulating valve 60 to change the cross-sectional area of the clutch fluid path of the hydraulic oil line 47.

Then, at step S20, it is determined whether or not the clutch stroke ST is equal to or less than a threshold TH3. The threshold TH3 is set to a value smaller than the clutch engagement point at which the motive power from the engine 10 is started to be connected to the transmission 13. In the present embodiment, the threshold TH3 is set as: TH3=clutch stroke 40%. If ST>TH3, the present control is ended. If ST≤TH3, control proceeds to the subsequent step S21 where the flow volume restriction performed by the flow volume regulating valve 60 is cancelled, and then the present process is ended.

Figure 5A:
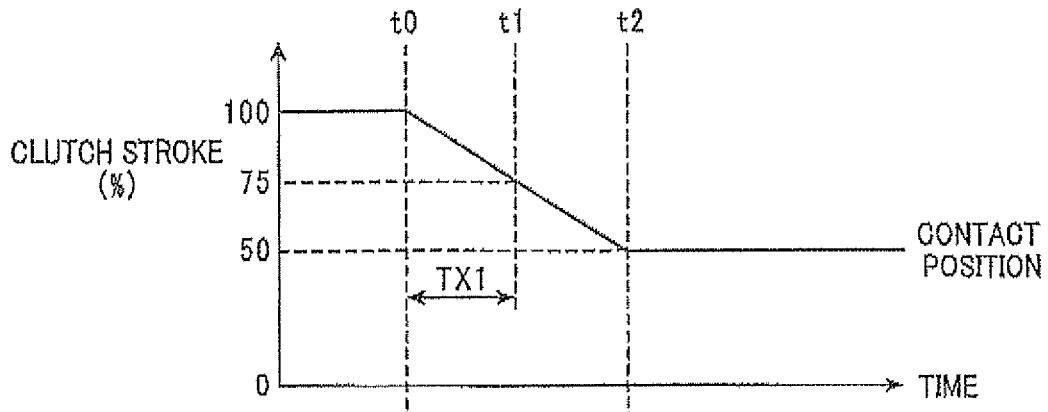
FIGS. 5A to 5C are time diagram each specifically illustrating a clutch engagement process in the system.
Figure 5B:
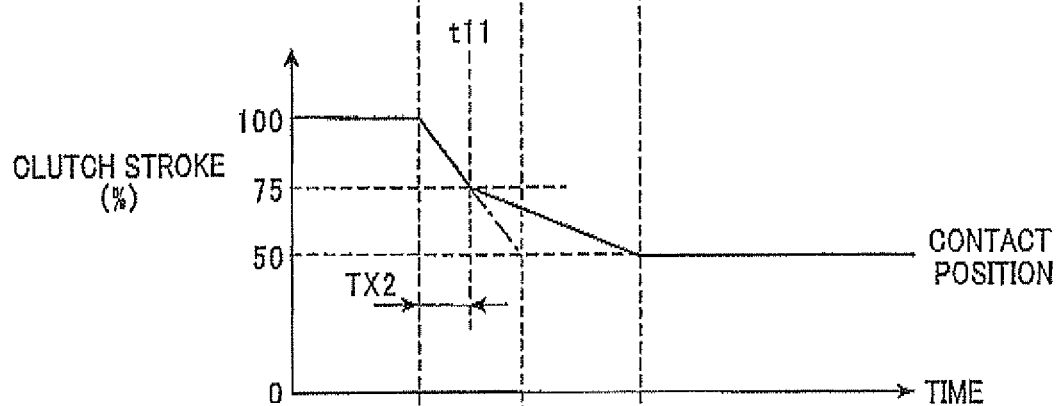
Figure 5C:
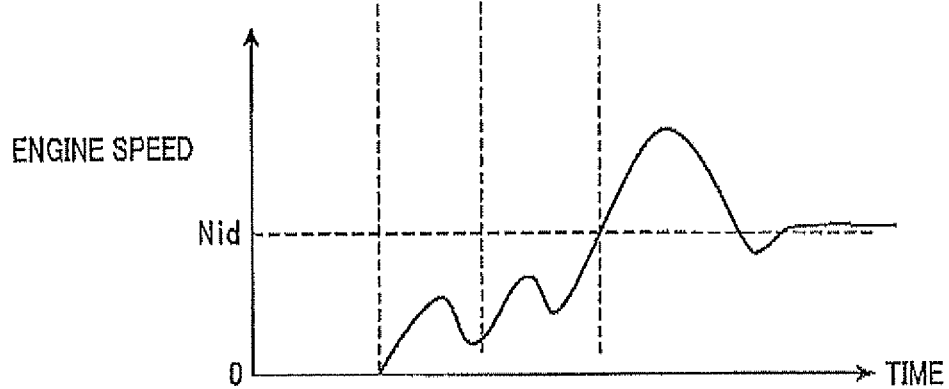

FIGS. 5A to 5C are time diagrams specifically illustrating the to clutch engagement control. FIGS. 5A and 5B show the cases where the rates of change of the clutch stroke are different from each other after the start of engine restart. FIG. 5A shows the case where the rate of change of the clutch stroke is comparatively small. FIG. 5B shows the case where the rate of change of the clutch stroke is comparatively large. FIG. 5C shows the change of the engine speed.

It should be appreciated that, here, the timing of starting engine restart is set to the timing (t0 in the figures) when the clutch stroke starts decreasing from 100%. Thus, at the timing t0, cranking is started by the starter 16 and fuel injection is started by the injectors 15. After the timing to, measurement of the elapsed time TX is started.

In FIG. 5A, the depressing manipulation of the clutch pedal 17 by the driver is released after the timing t0 to gradually decrease the clutch stroke. An elapsed time TX1 is measured during the period up to timing t1 at which "clutch stroke=75%". The clutch stroke shown in FIG. 5A is based on the assumption that the rate of change of the clutch stroke is comparatively small. Accordingly, the elapsed time TX1 is comparatively long. Therefore, the flow volume of the clutch fluid is not restricted after the timing t1 but the rate of change of the clutch stroke is maintained as it is. In other words, the rate of change of the clutch stroke is in correspondence with the driver's manipulation speed of the clutch pedal.

Then, when the clutch stroke has reached the contact position (the clutch engagement point which is 50% in the present embodiment), i.e. at timing t2, the clutch-engaging operation is performed. Since the engine speed has already reached an idling speed Nid at the timing t2, no problem will be posed for the engine startability.

On the other hand, in FIG. 5B, the clutch stroke gradually decreases after the timing t0 as in the case of FIG. 5A. Meanwhile, an elapsed time TX2 is measured during the period up to timing t11 when "clutch stroke=75%".

The clutch stroke shown in FIG. 5B is based on the assumption that the rate of change of the clutch stroke is comparatively large. Accordingly, the elapsed time TX2 is comparatively short (TX2<TX1). Therefore, the flow volume of the clutch fluid is restricted after the timing t11 to reduce the rate of change of the clutch stroke.

The rate of change of the clutch stroke from the timing t0 to the timing t11 depends on the driver's manipulation of the clutch pedal. Meanwhile, the rate of change of the clutch stroke after the timing t11 is delayed in relation to the driver's manipulation of the clutch pedal.

Let us assume that the clutch stroke decreases after the timing t11, keeping the rate of change of the clutch stroke from the timing t0 to the timing t11. In this case, the clutch stroke will progress as indicated by the dashed line in FIG. 5B and will reach the contact position at timing t12 to allow the clutch-engaging operation to be performed. However, since the engine speed has not reached the idling speed Nid at the timing t12, the engine startability is considered to be adversely affected after this time point.

In this regard, in the present invention, the timing for the clutch stroke to reach the contact position will be delayed by reducing the change of rate of the clutch stroke after the timing t11. Thus, similar to the case of FIG. 5A, the clutch stroke will reach the contact position at the timing t2. In this way, the clutch-engaging operation can be conducted in the state where the engine speed has reached the idling speed Nid, whereby the engine startability is prevented from being adversely affected.

In the clutch strokes shown in FIGS. 5A and 5B, the engine speed is ensured to reach the idling speed Nid at the timing t2. This timing t2, for example, corresponds to the time point when the time for ensuring a predetermined engine-speed increase has expired from engine restart.

In both of FIGS. 5A and 5B, the clutch 12 is ensured to be brought into the clutch-engaged state after the timing t2. In other words, before the timing t2, the clutch 12 is ensured not to be brought into the clutch-engaged state.

According to the present embodiment described so far, the following advantages can be obtained.

It has been so configured that the elapsed time TX from the start of the restart of the engine 10 has been calculated, and that, based on the calculated elapsed time TX, the engagement operation (switchover operation) of the clutch 12 is delayed after the start of the releasing manipulation of the clutch pedal 17. In particular, under the delay control, the engine speed has been ensured to reach the predetermined startup-completion engine speed by the time when the clutch-engaged state is achieved.

Thus, the problem that would be caused at the engine restart can be prevented, the problem being that the motive power is started to be connected to the transmission 13 before the full increase of the engine speed and that the engine speed is prevented from increasing. As a result, the startability at the engine restart can be enhanced.

It has been so configured that the degree of delay of the engagement operation in the clutch 12 is changed, based on the elapsed time TX.

Thus, the clutch-engaging operation can be delayed against the change of the clutch manipulation timing for the engine restart timing, or against the change of the clutch manipulation speed or the like of the moment, whereby the startability can be expected to be further enhanced.

The clutch-engaging operation has been configured to be delayed only when the elapsed time TX is equal to or less than the threshold K1. Thus, the probability that the engine startup is adversely affected will be lowered to thereby eliminate the disadvantage of carrying out the clutch-engaging operation when the operation is not necessary.

It has been ensured that the engine restart conditions of the engine 10 include the condition of performing releasing manipulation of the clutch pedal 17. Thus, the engine restart can be delayed up until immediately before the vehicle actually starts running. Such delay is considered to be advantageous in enhancing fuel efficiency.

Also, in the case where the engine restart conditions have been met by performing the releasing manipulation of the clutch pedal 17 to restart the engine, the elapsed time TX has been measured during the period when the clutch stroke decreases by a predetermined amount (the period in which clutch stroke changes from 98% to 75%).

In this case, the elapsed time TX substantially corresponds to the manipulation speed of the clutch pedal 17 after starting the clutch releasing manipulation. The engagement operation of the clutch 12 can be delayed against the manipulation speed. Accordingly, an appropriate delay control can again be performed and thus the startability can be expected to be enhanced.

(Second Embodiment)

Hereinafter will be described a second embodiment of the present invention, focusing on the differences from the first embodiment described above.

In the second embodiment, components identical with or similar to those in the first embodiment are given the same reference numerals for the sake of omitting explanation.

The first embodiment has been configured to delay the clutch-engaging operation based on the elapsed time from the start of engine restart. This configuration is changed in the second embodiment.

Specifically, in the second embodiment, an engine-speed-increase lead time is preset. The "engine-speed-increase lead time" here refers to the time required for increasing the engine speed from the start of engine restart up to the time point when the engine speed reaches the startup-completion engine speed (e.g., idling speed). Then, the clutch-engaging operation is delayed based on the remaining time of the engine-speed-increase lead time.

FIG. 6 is a flow diagram illustrating the procedure of a clutch engagement control. The present control is repeatedly executed by the ECU 30 at a predetermined cycle.

In FIG. 6, the processes performed at steps S31 to S36 are similar to those performed at steps S11 to S16, respectively, of FIG. 2. Based on these processes, the process of restarting the engine 10 is started. Meanwhile, the elapsed time TX is measured after the start of engine restart up to the time point when "clutch stroke=75%" (threshold TH2) is satisfied.

Then, at step S37, it is determined whether or not an engine speed NE of the moment is lower than an engine speed threshold Nth. The engine speed threshold Nth is set based on the startup-completion engine speed with which the startup of the engine 10 can be determined to be completed. For example, the engine speed threshold Nth is set to the idling speed.

The startup-completion engine speed may be set to a level a little lower or a little higher than the idling speed, but may desirably be set to a level proximate to the idling speed. In this case, if the engine speed NE has fully increased, i.e. if NE≥Nth, the clutch-engaging operation is not required to be delayed, and thus the present control is ended. On the other hand, if NE<Nth, control proceeds to the subsequent step S38.

At step S38, it is determined whether or not the elapsed time TX of the moment is equal to or less than a predetermined threshold K2. The threshold K2 corresponds to the engine-speed-increase lead time, i.e. the time from the start of engine restart up to the time point when the engine speed reaches a predetermined startup-completion engine speed (e.g., idling speed). The engine-speed-increase lead time can be estimated in advance based on the engine characteristics, the starter characteristics, and the like. In the present embodiment, the engine-speed-increase lead time is set to 500 msec (i.e. K2=500 msec).

If TX>K2, this means that the elapsed time from the engine restart is sufficiently long. Accordingly, it can be estimated that the engine speed has fully increased so that, from this time onward, the clutch-engaged state can be achieved at any timing.

On the other hand, if TX≤K2, this means that the elapsed time from the engine restart is short. Accordingly, it can be estimated there is a probability that the engine speed will not have fully increased at the time point when the clutch-engaged state is achieved.

If TX>K2 ("NO" at step S38), the present control is ended. In this case, the opening of the flow volume regulating valve 60 remains maximum, and thus no delay control is performed to delay the clutch-engaging operation.

If TX≤K2 ("YES" at step S38), the delay control is performed at step S39 and the subsequent steps to delay the clutch-engaging operation. Specifically, at step S39, a remaining time TY of the engine-speed-increase lead time (K2=500 msec) is calculated, while the flow volume of the clutch fluid to be passed through the hydraulic oil so line 47 is calculated based on the remaining time TY.

Figure 7:
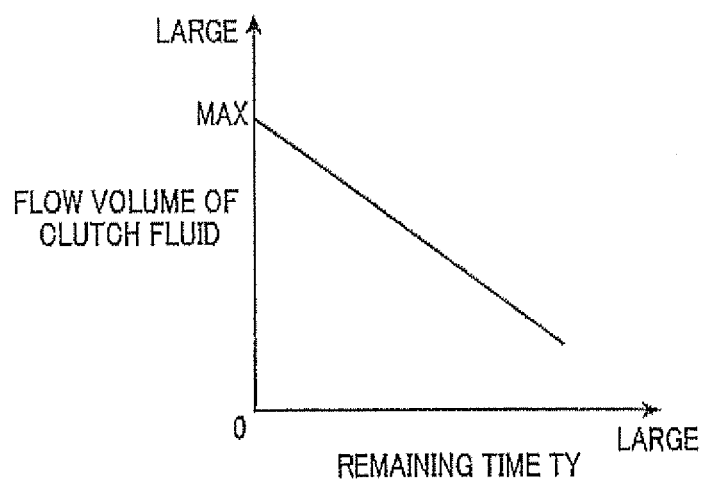
FIG. 7 illustrates a relationship between remaining time and flow volume of clutch fluid according to the second embodiment.

In this case, the flow volume of the clutch fluid is calculated using the relationship shown in FIG. 7, for example. In FIG. 7, it is ensured that, as the remaining time TY is shorter, the flow volume of the clutch fluid is calculated to be a larger value. When TY=0, the flow volume of the clutch fluid becomes equal to a maximum flow volume MAX. In other words, in FIG. 7, a relationship is established such that, as the remaining time TY is larger, the restricted amount of the flow volume of the clutch fluid becomes larger (i.e. the degree of delay becomes larger).

The processes performed at the subsequent steps S40 to S42 are similar to those performed at steps S19 to S21 of FIG. 2. Based on these processes, the flow volume regulating valve 60 is actuated to regulate, as appropriate, the flow volume of the clutch fluid. Thus, the flow volume is restricted by the flow volume regulating valve 60 up until the clutch stroke ST becomes equal to or less than the threshold TH3.

According to the second embodiment described above, the startability at the engine restart can be enhanced as in the first embodiment.

The second embodiment has been so configured that, after the start of engine restart, the clutch-engaging operation is delayed after the start of the releasing manipulation of the clutch pedal 17, based on the remaining time TY of the engine-speed-increase lead time (K2=500 msec). Thus, an appropriate delay control can again be performed.

Also, it has been so configured in the second embodiment that the degree of delay of the clutch-engaging operation is changed based on the remaining time TY.

Thus, the clutch-engaging operation can be delayed against the change of the clutch manipulation timing for the engine restart timing, or against the change of the clutch manipulation speed of the moment, whereby the startability can be expected to be further enhanced.

In the configuration of the second embodiment, the clutch-engaging operation has been delayed when the engine speed NE is lower than the predetermined engine speed threshold Nth, and the clutch-engaging operation has not been delayed when the engine speed NE is larger than the engine speed threshold Nth. Thus, unnecessary delay control can be prevented from being performed over the clutch-engaging operation.

(Modifications)

The present invention is not limited to the embodiments described above, but may be implemented as set forth below.

The first embodiment has been configured to calculate the elapsed time TX from the start of the restart of the engine 10 and to delay the clutch-engaging operation based on the elapsed time TX.

Alternative to this, the manipulation speed of the clutch pedal 17 after the start of the clutch releasing manipulation may be calculated, and the clutch-engaging operation may be delayed based on the calculated manipulation speed. In this case, the degree of delaying the clutch-engaging operation may be changed based on the manipulation speed of the clutch pedal 17. For example, as the manipulation speed of the clutch pedal 17 is larger, the degree of delay may be made larger.

The configuration of the flow volume regulating valve 60 shown in FIG. 1 may be optional if only the valve can regulate the flow volume of the clutch liquid. Specifically, in the configurations of the first and second embodiments, the throttle has been operated by an electromagnetic actuator. Alternatively, however, the throttle may be operated by oil pressure or air pressure, or by a spring force.

Figure 8:
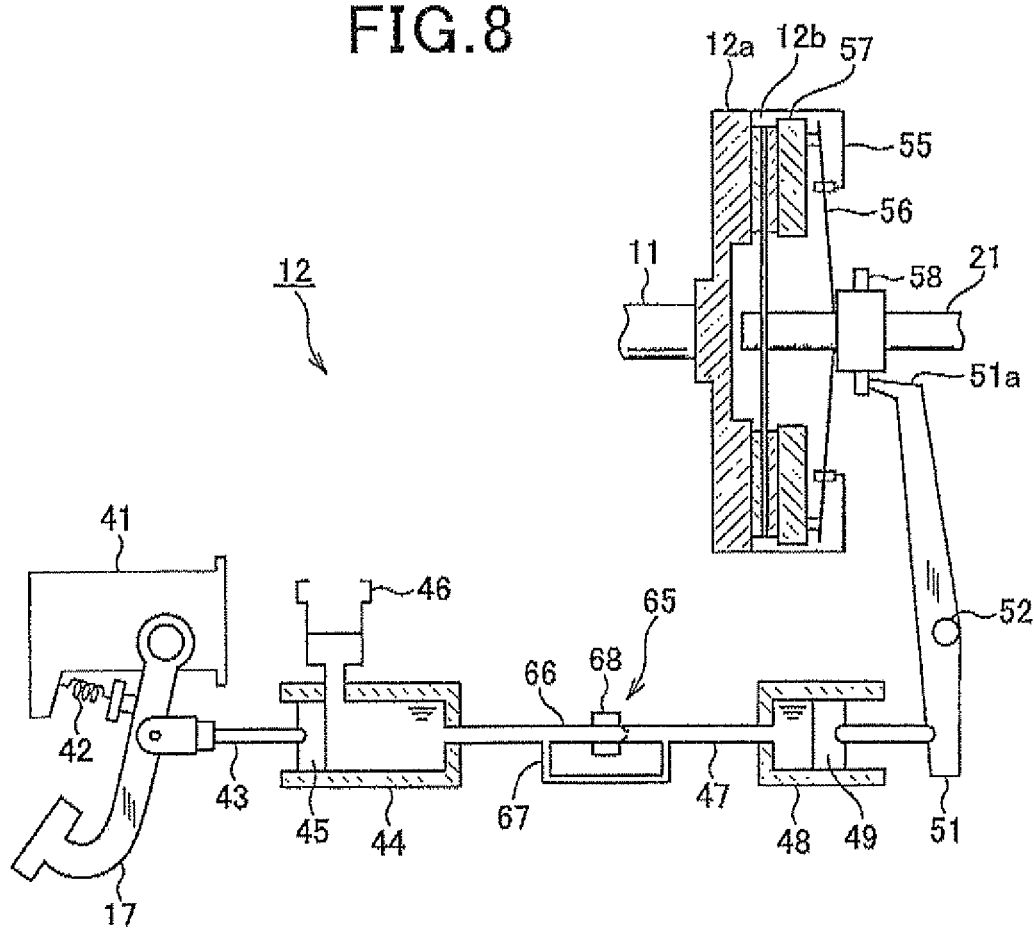
FIG. 8 is a schematic diagram illustrating a clutch according to a modification of the present invention.

The clutch-engaging operation may be adapted to be delayed from the releasing manipulation of the clutch pedal 17 without using the electrical configuration (ECU and electrical actuators to be controlled by the ECU). Such a configuration is explained referring to FIG. 8. FIG. 8 shows a configuration with partial changes of the configuration shown in FIG. 2. The components identical with or similar to those in FIG. 2 are given the same reference numerals for the sake of omitting explanation.

In the clutch 12 shown in FIG. 8, the master cylinder 44 is interlocked with the movement of the clutch pedal 17. The release cylinder 48 is in communication with the master cylinder 44 via the hydraulic oil line 47. The hydraulic oil line 47 is provided with a flow volume regulating mechanism 65 which plays a ruler of reducing the flow volume of the clutch fluid that flows from the release cylinder 48 to the master cylinder 44 when the clutch pedal 17 is released from being depressed, so as to be less than the flow volume of the clutch fluid that flows from the master cylinder 44 to the release cylinder 48 when the clutch pedal 17 is depressed.

In the flow volume regulating mechanism 65, the hydraulic oil line 47 is branched into two parallel piping lines. One of the parallel piping lines is a first piping line 66 constituting a "first path", and the other one of them is a second piping line 67 constituting a "second path". Specifically, two-channel parallel clutch fluid paths are configured by the piping lines 66 and 67. The first piping line 66 is provided with a check valve 68 serving as checking means to allow the clutch fluid to pass from the master cylinder 44 to the release cylinder 48, and to block backward flow of the clutch fluid or restrict the backward flow to a small volume. The second piping line 67 is provided detouring around the check valve 68. The second piping line 67 has a cross-sectional area smaller than that of the first piping line 66.

With the configuration described above, the clutch fluid mainly passes through the first piping line 66 when the clutch pedal 17 is depressed, and afterwards, when the clutch pedal 17 is released from being depressed, the clutch fluid mainly passes through the second piping line 67. In this case, the flow volume of the clutch fluid can be decreased (restricted) when the clutch pedal 17 is released from being so depressed, owing to the smaller cross-sectional area of the piping line 67. As a result, the clutch-engaging operation can be intentionally delayed from the releasing manipulation of the clutch pedal 17. Thus, in the case where the driver has quickly released the clutch pedal 17 immediately after the start of engine restart, the engine startability can be prevented from being deteriorated, which deterioration would otherwise have been caused by the quick clutch manipulation.

The maximum value of the delay time in the above configuration may be about 100 to 200 msec or the like. Thus, the delay control can be performed without causing concern to the driver. In other words, the driver can normally feel a contact response of the clutch 12.

Without using an electrical configuration (ECU and electrical actuators to be controlled by the ECU), another delay mechanism may be configured for delaying the clutch-engaging operation. Specifically, the driver will manipulate the clutch pedal 17 to disconnect the motive power from the engine to the transmission (depressing manipulation), and then from this state, the driver will manipulate the clutch pedal 17 to connect the motive power therebetween (releasing manipulation). In this case, in the present delay mechanism, the operation of the clutch pedal 17 is allowed to be delayed from the driver's manipulation of the clutch pedal 17.

More specifically, the spring force (spring constant) of the return spring 42 that permits the clutch pedal 17 to restore from the depressed state to the non-depressed state may be set based on a certain rule. That is, the spring force of the return spring 42 may be set so that, when the speed of withdrawing the driver's foot from the clutch pedal 17 (foot withdrawal speed) is equal to or less than a predetermined speed, the speed of restoration of the clutch pedal 17 per se to the non-depressed state becomes equal to the driver's foot withdrawal speed, and that, when the driver's foot withdrawal speed of the clutch pedal 17 is higher than the predetermined speed, the speed of restoration of the clutch pedal 17 per se to the non-depressed state becomes lower than the driver's foot withdrawal releasing speed. In this case, if the driver's foot withdrawal motion is quick, a gap may be produced between the driver's sole and the clutch pedal 17. The present delay mechanism is configured to tolerate the gap.

With the above configuration, the clutch 12 can be brought into the clutch-engaged state (clutch-contact state) after expiration of a predetermined time from the start of engine restart (e.g., a predetermined time required for ensuring the engine-speed increase from the start of engine restart). In other words, the clutch 12 will not be brought into the clutch-engaged state (clutch-contact state) before the expiration of the predetermined time after the start of engine restart.

In order to delay the restoration speed of the clutch pedal 17, the spring force (spring constant) of the return spring may be made small. The small spring force of the return spring may be considered to lighten the clutch pedal and thus may improve the feeling at the time of depressing the clutch pedal. However, if the restoration speed of the clutch pedal 17 is allowed to be excessively slow, the clutch pedal 17 will not follow the driver's releasing manipulation (foot withdrawal motion). As a result, the driver may become concerned about his vehicle. Therefore, it is considered that the spring force is required to have a force of more than a certain level. Specifically, the restoration time (from the fully depressed state) of the clutch pedal 17 may be required to be about 100 to 300 msec.

In the above embodiments, the manipulating part of the clutch means (clutch manipulation member) has been a clutch pedal. Alternatively, the clutch manipulation member may be of a grip type, or the like, other than the pedal type.

The present invention may be embodied in several other forms without departing from the spirit thereof. The embodiments and modifications described so far are therefore intended to be only illustrative and not restrictive, since the scope of the invention is so defined by the appended claims rather than by the description preceding them. All changes that fall within the metes and bounds of the claims, or equivalents of such metes and bounds, are therefore intended to be embraced by the claims.

What is claimed is:

1. An idle stop system for an engine mounted in a vehicle; comprising:
    clutch means that that enables and disables power transmitted from the engine to a transmission depending on instructions from a driver on the vehicle, wherein the clutch comprises a manipulation device that produces the instructions in response to manipulations by the driver and a clutch mechanism that selectively provides a engaged state thereof for transmitting the power and a disengaged state thereof for shutting off the power;
    first determination means that determines whether or not predetermined stop conditions are met when the engine is in operation;
    first control means that automatically stop the operation of the engine when it is determined by the first determination means that the predetermined stop conditions are met;
    second determination means that determines whether or not predetermined restart conditions are met after the engine is stopped by the first control means;
    second control means that restarts the operation of the engine when it is determined by the second determination means that the predetermined restart conditions are met;
    third determination means that determines whether or not a predetermined period of time has elapsed since the restart of the engine; and
    third control means that instructs the clutch mechanism to engage at and after a time instant when it is determined by the third determination means that the predetermined period of time has elapsed.

2. The idle stop system of claim 1, wherein the third control means includes delay control means that delays a switchover from the disengaged state of the clutch mechanism to the engaged state of the clutch mechanism in response to a driver's manipulation of the manipulation device.

3. The idle stop system of claim 2, wherein the delay control means is configured to delay the switchover from the disengaged state to the engaged state of the clutch mechanism after the driver's manipulation such that the engine reaches a predetermined rotation speed at a time instant when the engaged state of the clutch mechanism is completed, the predetermined rotation speed showing completion of starting up the engine.

4. The idle stop system of claim 3, further comprising elapsed time calculation means that calculates an elapsed time from restarting the engine,
    wherein the delay control means is configured to delay the switchover from the disengaged state to the engaged state of the clutch mechanism based on the elapsed time calculated by the elapsed calculation means.

5. The idle stop system of claim 4, wherein the delay control means is configured to change a delay time required to start the switchover from the disengaged state to the engaged state of the clutch mechanism, depending on the calculated elapsed time.

6. The idle stop system of claim 3, wherein a time of period required for the engine to reach the predetermined rotation speed is fixed beforehand, and
the delay control means includes means for obtaining a rest of time of period which is left in the time of period required for the engine to reach the predetermined rotation speed, and means for controlling the delay time for the switchover of the clutch mechanism from the disengaged state to the engaged state.

7. The idle stop system of claim 3, wherein
the predetermined restart conditions are composed of a driver's restart manipulation of the manipulation device for restarting the engine,
the second determination means includes manipulation determination means for determining whether or not the driver's restart manipulation has been performed at the manipulation device,
the system comprises means for detecting a speed of the driver's restart manipulation after the manipulation means determines that the driver's restart manipulation has been performed, and
the delay control means is configured to control the delay for the switchover of the clutch mechanism from the disengaged state to the engaged state, depending on the speed of the driver's restart manipulation.

8. The idle stop system of claim 3, further comprising:
rotation speed detecting means for detecting the rotations speed of the engine; and
rotation speed determining means for determining, after restarting the engine but before the engaged state of the clutch mechanism, whether or not the rotation speed of the engine detected by the rotation speed detecting means is larger than the predetermined rotation speed showing completion of starting up the engine,
wherein the delay control means is configured to enable the delay of the switchover of the clutch mechanism from the disengaged state thereof to the engaged state thereof when the rotation speed determining means determines that the detected rotation speed of the so engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

9. The idle stop system of claim 8, further comprising:
a master cylinder that operates in response to the driver's manipulation of the clutch device;
a fluid path through which clutch fluid passes; and
a release cylinder connected to the master cylinder via the fluid path,
wherein the delay control means is configured to adjust a volume of the clutch fluid passing the fluid path such that the delay for the switchover of the clutch mechanism from the disengaged state thereof to the engaged state thereof is controlled.

10. The idle stop system of claim 2, further comprising:
a master cylinder that operates in response to the driver's manipulation of the clutch device;
a fluid path through which clutch fluid passes; and
a release cylinder connected to the master cylinder via the fluid path,
wherein the delay control means is a fluid volume adjuster that adjusts the clutch fluid such that a volume of the fluid volume passing from the master cylinder to the release cylinder when the manipulation device is manipulated for the disengaged state is less than a volume of the fluid passing from the release cylinder to the master cylinder when the manipulation device is manipulated for the engaged state.

11. The idle stop system of claim 10, wherein
the fluid path is provided with a first path and a second path which are in parallel with each other,
the fluid volume adjuster comprises a check valve means which i) enables the clutch fluid to pass from the master cylinder to the release cylinder and ii) enables the clutch fluid to pass at a lesser volume thereof or to be prohibited from the release cylinder to the master cylinder, the check valve being provided in the first path, and
the second path is provided to bypass the check valve means and has a flow path area smaller than a flow path area of the first path.

12. The idle stop system of claim 1, wherein the third control means is a delay mechanism that is provided at the clutch means and formed to generate a delay in operating the manipulation device from a timing at which the driver manipulates the manipulation device to restart the engine.

13. The idle stop system of claim 12, wherein the manipulation device comprises a member that allows the driver to manipulates the clutch device,
the clutch means has biasing means that restores the member from a manipulated state thereof to a non-manipulated state thereof, and
the delay mechanism has a bias force which is set such that, when a speed of a driver's release manipulation from the member is equal to or less than a predetermined amount, a restoration speed of the member to the non-manipulated state thereof is substantially equal to the speed of the driver's release manipulation, and when the speed of the driver's release manipulation from the member is larger than the predetermined amount, the restoration speed of the member to the non-manipulated state thereof is smaller than the speed of the driver's release manipulation.

14. The idle stop system of claim 4, further comprising:
rotation speed detecting means for detecting the rotations speed of the engine; and
rotation speed determining means for determining, after restarting the engine but before the engaged state of the clutch mechanism, whether or not the rotation speed of the engine detected by the rotation speed detecting means is larger than the predetermined rotation speed showing completion of starting up the engine,
wherein the delay control means is configured to enable the delay of the switchover of the clutch mechanism from the disengaged state thereof to the engaged state thereof when the rotation speed determining means determines that the detected rotation speed of the engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

15. The idle stop system of claim 14, further comprising:
a master cylinder that operates in response to the driver's manipulation of the clutch device;

a fluid path through which clutch fluid passes; and a release cylinder connected to the master cylinder via the fluid path, wherein the delay control means is configured to adjust a volume of the clutch fluid passing the fluid path such that the delay for the switchover of the clutch mechanism from the disengaged state thereof to the engaged state thereof is controlled.

16. The idle stop system of claim 5, further comprising:

rotation speed detecting means for detecting the rotations speed of the engine; and rotation speed determining means for determining, after so restarting the engine but before the engaged state of the clutch mechanism, whether or not the rotation speed of the engine detected by the rotation speed detecting means is larger than the predetermined rotation speed showing completion of starting up the engine, wherein the delay control means is configured to enable the delay of the switchover of the clutch mechanism from the disengaged state thereof to the engaged state thereof when the rotation speed determining means determines that the detected rotation speed of the engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

17. The idle stop system of claim 16, further comprising:

a master cylinder that operates in response to the driver's manipulation of the clutch device;

a fluid path through which clutch fluid passes; and a release cylinder connected to the master cylinder via the fluid path, wherein the delay control means is configured to adjust a volume of the clutch fluid passing the fluid path such that the delay for the switchover of the clutch mechanism from the disengaged state thereof to the engaged state thereof is controlled.

18. The idle stop system of claim 6, further comprising:

rotation speed detecting means for detecting the rotations speed of the engine; and rotation speed determining means for determining, after restarting the engine but before the engaged state of the clutch mechanism, whether or not the rotation speed of the engine detected by the rotation speed detecting means is larger than the predetermined rotation speed showing completion of starting up the engine, wherein the delay control means is configured to enable the delay of the switchover of the clutch mechanism from the disengaged state thereof to the engaged state thereof when the rotation speed determining means determines that the detected rotation speed of the engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

19. The idle stop system of claim 18, further comprising:

a master cylinder that operates in response to the driver's manipulation of the clutch device;

a fluid path through which clutch fluid passes; and a release cylinder connected to the master cylinder via the fluid path, wherein the delay control means is configured to adjust a volume of the clutch fluid passing the fluid path such that the delay for the switchover of the clutch mechanism from the disengaged state thereof to the engaged state thereof is controlled.

20. The idle stop system of claim 7, further comprising:

rotation speed detecting means for detecting the rotations speed of the engine; and rotation speed determining means for determining, after restarting the engine but before the engaged state of the clutch mechanism, whether or not the rotation speed of the engine detected by the rotation speed detecting means is larger than the predetermined rotation speed showing completion of starting up the engine, wherein the delay control means is configured to enable the delay of the switchover of the clutch mechanism from the disengaged state thereof to the engaged state thereof when the rotation speed determining means determines that the detected rotation speed of the engine is not larger than the predetermined rotation speed, and disable the delay of the switchover of the clutch mechanism from the engaged state thereof to the engaged state thereof when the rotation speed determining means determines that the detected rotation speed of the engine is larger than the predetermined rotation speed.

* * * * *